United States Patent
Kobayashi

(10) Patent No.: US 10,718,419 B2
(45) Date of Patent: Jul. 21, 2020

(54) METHOD FOR LUBRICATING STRAIN WAVE GEARING

(71) Applicant: HARMONIC DRIVE SYSTEMS INC., Shinagawa-ku, Tokyo (JP)

(72) Inventor: Masaru Kobayashi, Azumino (JP)

(73) Assignee: HARMONIC DRIVE SYSTEMS INC., Shinagawa-Ku, Tokyo (JP)

( * ) Notice: Subject to any disclaimer, the term of this patent is extended or adjusted under 35 U.S.C. 154(b) by 611 days.

(21) Appl. No.: 15/528,706

(22) PCT Filed: Nov. 28, 2014

(86) PCT No.: PCT/JP2014/081578
§ 371 (c)(1),
(2) Date: May 22, 2017

(87) PCT Pub. No.: WO2016/084235
PCT Pub. Date: Jun. 2, 2016

(65) Prior Publication Data
US 2017/0254404 A1    Sep. 7, 2017

(51) Int. Cl.
*F16H 49/00* (2006.01)
*F16H 57/04* (2010.01)
(Continued)

(52) U.S. Cl.
CPC ......... *F16H 49/001* (2013.01); *C10M 103/00* (2013.01); *C10M 103/02* (2013.01);
(Continued)

(58) Field of Classification Search
CPC ............. F16H 49/001; F16H 2049/003; F16H 57/0025; C10M 103/00; C10M 103/02; C10M 103/06; C10M 171/06
(Continued)

(56) References Cited

U.S. PATENT DOCUMENTS

| 3,414,084 A | 12/1968 | Bues et al. |
| 4,825,720 A * | 5/1989 | Capdepuy ............. F16H 49/001 74/468 |

(Continued)

FOREIGN PATENT DOCUMENTS

| DE | 10 2008 044 109 A1 | 6/2010 |
| JP | 4-18476 U | 2/1992 |

(Continued)

OTHER PUBLICATIONS

International Search Report (PCT/ISA/210) dated Feb. 10, 2015, by the Japanese Patent Office as the International Searching Authority for International Application No. PCT/JP2014/081578 (4 pages).
(Continued)

*Primary Examiner* — Ha Dinh Ho
(74) *Attorney, Agent, or Firm* — Buchanan Ingersoll & Rooney PC

(57) ABSTRACT

A strain wave gearing has contact parts which are the portions to be lubricated other than the teeth of an externally toothed gear and an internally toothed gear, the contact parts being respectively lubricated with an inorganic lubricating powder having a lamellar crystal structure. The lubricating powder, during the operation of the strain wave gearing, is crushed between the contact surfaces of each of the contact parts to move and adhere to the contact surfaces, thereby forming thin surface films thereon. Additionally, the powder is thinly spread by pressure and reduced into finer particles to change into a shape which facilitates intrusion into the space between the contact surfaces. By both the fine particles having changed in shape and the surface films, the lubrication of the contact parts is maintained. Neither the fine particles nor the surface films are viscous.

5 Claims, 4 Drawing Sheets

(51) Int. Cl.
*C10M 103/00* (2006.01)
*C10M 103/02* (2006.01)
*C10M 103/06* (2006.01)
*C10M 171/06* (2006.01)
*F16H 1/32* (2006.01)
*C10N 20/06* (2006.01)
*C10N 30/06* (2006.01)
*C10N 40/04* (2006.01)
*C10N 50/08* (2006.01)
*F16J 15/50* (2006.01)

(52) U.S. Cl.
CPC ........ *C10M 103/06* (2013.01); *C10M 171/06* (2013.01); *F16H 1/32* (2013.01); *F16H 57/041* (2013.01); *C10M 2201/041* (2013.01); *C10M 2201/0413* (2013.01); *C10M 2201/061* (2013.01); *C10M 2201/065* (2013.01); *C10M 2201/066* (2013.01); *C10M 2201/0613* (2013.01); *C10M 2201/0653* (2013.01); *C10M 2201/0663* (2013.01); *C10N 2020/06* (2013.01); *C10N 2030/06* (2013.01); *C10N 2040/04* (2013.01); *C10N 2050/08* (2013.01); *F16H 57/04* (2013.01); *F16H 57/0409* (2013.01); *F16H 2049/003* (2013.01); *F16J 15/50* (2013.01)

(58) Field of Classification Search
USPC .......................................................... 74/640
See application file for complete search history.

(56) References Cited

U.S. PATENT DOCUMENTS

| | | | |
|---|---|---|---|
| 6,672,181 B2 * | 1/2004 | Kobayashi | F16H 49/001 74/640 |
| 6,854,351 B2 * | 2/2005 | Yabe | F16C 19/20 384/45 |
| 8,402,859 B2 * | 3/2013 | Neelakantan | F16H 63/18 74/337.5 |
| 2002/0178861 A1 | 12/2002 | Kobayashi | |

FOREIGN PATENT DOCUMENTS

| | | |
|---|---|---|
| JP | 7-18280 A | 1/1995 |
| JP | 7-205899 A | 8/1995 |
| JP | 2002-349681 A | 12/2002 |
| JP | 2003-042354 A | 2/2003 |
| JP | 2007-169426 A | 7/2007 |
| JP | 2009-41747 A | 2/2009 |
| JP | 2011-064304 A | 3/2011 |
| JP | 2013-092217 A | 5/2013 |

OTHER PUBLICATIONS

Written Opinion (PCT/ISA/237) dated Feb. 10. 2015, by the Japanese Patent Office as the International Searching Authority for International Application No. PCT/JP2014/081578 (3 pages).

* cited by examiner

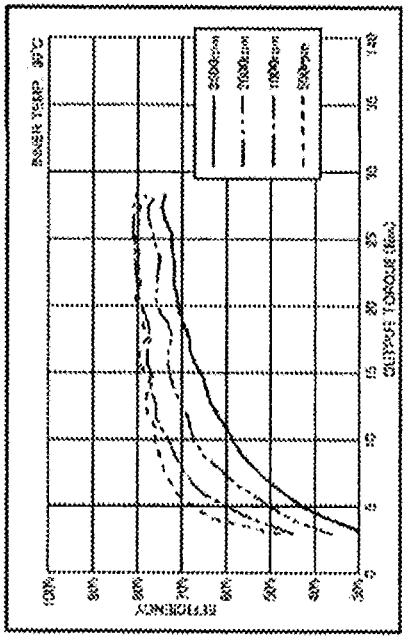
FIG. 2(A) GREASE LUBRICATION TYPE A
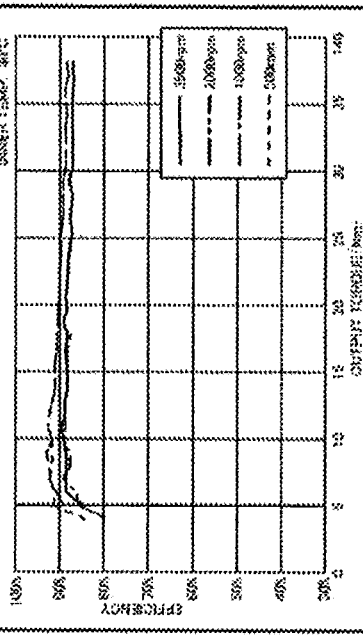
FIG. 2(C) GREASE LUBRICATION TYPE B
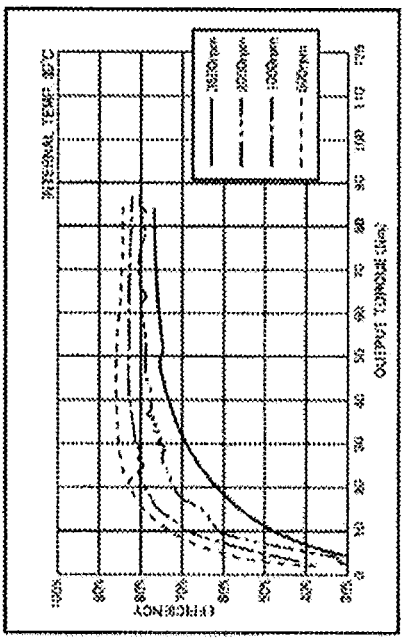
FIG. 2(B) FINE-POWDER LUBRICATION
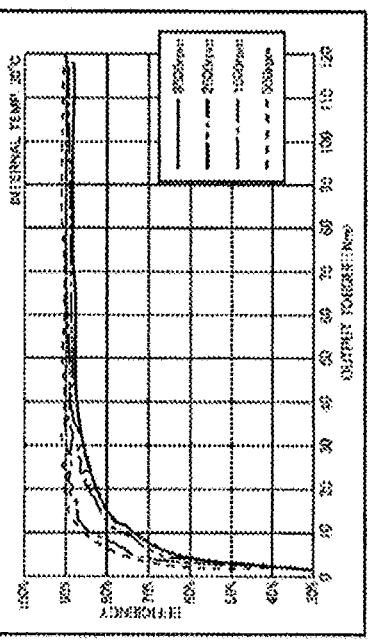
FIG. 2(D) FINE-POWDER LUBRICATION (FINE PARTICLES AFTER OPERATION IS STARTED)

(FINE POWDERS CRUSHED INTO A THIN FLAKY SHAPE BY SPREADING BY PRESSURE)

METHOD FOR LUBRICATING STRAIN WAVE GEARING

TECHNICAL FIELD

The present invention relates to a strain wave gearing, and more specifically to a method for lubricating a strain wave gearing with using lubricating powders.

BACKGROUND ART

Strain wave gearings are often lubricated with an oil or grease. A strain wave gearing disclosed in Patent document 1 is provided with a mechanism in which a grease is supplied from a grease reservoir to portions where lubrication is required. In a strain wave gearing disclosed in Patent document 2, an oil tank is mounted inside a cup-shaped externally toothed gear so as to rotate integrally with the externally toothed gear, whereby making use of centrifugal force to supply an oil from the oil tank to portions where lubrication is required. In a power transmission device disclosed in Patent document 3, for the purpose of reducing friction and wear between sliding members, the sliding surfaces of these member are set to be a surface having a prescribed surface roughness and being covered with a carbon based film, and additionally a grease is employed to lubricate between the sliding surfaces covered with the carbon-based films.

PRIOR ART DOCUMENTS

Patent Documents

Patent Document 1: JP 2013-92217 A
Patent Document 2: JP 2011-64304 A
Patent Document 3: JP 2009-41747 A

SUMMARY OF THE INVENTION

Problems to be Solved by the Invention

A strain wave gearing is usually used as a reduction gear, and the wave generator of the strain wave gearing is rotated at high speeds by a motor or the like. In a case where an oil or grease is used to lubricate the portions of the wave generator contacting with the externally toothed gear and the contact portions inside of the wave generator, a viscous resistance loss of the wave generator which rotates at high speeds becomes large. Therefore, the efficiency in the low-load region and the high-speed rotation region of the strain wave gearing is decreased.

An object of the present invention is to propose a method for lubricating a strain wave gearing, which can greatly improve the efficiency in the low-load region and the high-speed rotation region of the strain wave gearing in comparison with a case in which a grease or oil is used as a lubricant.

Another object of the present invention is to provide a strain wave gearing which can greatly improve the efficiency in the low-load region and the high-speed rotation region of the strain wave gearing in comparison with a case in which a grease or oil is used as a lubricant.

Means of Solving the Problems

In order to solve the above problems, a method for lubricating a strain wave gearing of the present invention is characterized by using inorganic lubricating powders having a prescribed particle diameter and a prescribed hardness, and having a lamellar crystal structure, to lubricate each of contact parts of the strain wave gearing other than teeth of an externally toothed gear and an internally toothed gear.

The lubricating powder, which is filled in a state covering contact parts between a wave generator and other members, and contact parts inside the wave generator, is a solid lubricant with a lamellar crystal structure that slides along each layer surface thereof. The lubricant powder, during the operation of the strain wave gearing, is crushed between the contact surfaces of each of the contact parts, and is moved to adhere to the both contact surfaces of each contact part, thereby forming thin surface films thereon. Additionally, the powder is thinly spread by pressure and reduced into finer particles to change into a shape which facilitates intrusion into the inside parts (the space between the contact surfaces) of the contact parts.

By both the fine particles having changed in shape and the thin surface films formed on the both contact surfaces, the lubrication of each contact part is maintained. Since neither the thin surface films moved and adhered on the contact surfaces nor the fine particles subdivided via spread by pressure are viscous, its possible to realize a high efficiency in the low-load region and the high-speed rotation region of the strain wave gearing. Further, since the change in efficiency due to operational conditions is thus reduced, the controllability of the strain wave gearing is also enhanced.

In order to obtain a desired lubricating effect and realize a smooth rotation of the wave generator, it is desirable to use fine particles having an average particle diameter of 15 μm or less as the lubricating powder. It is also desirable that the lubricating powder is a soft particle having a Mohs hardness of 1.5 or less.

In particular, in order to exert a lubricating effect from the initial operational stage of the strain wave gearing so as to realize a smooth rotation of the wave generator, it is desirable to use fine particles obtained by crushing the lubricating powders into a flaky state via spreading by pressure.

As the lubricating powders having a lamellar crystal structure, it is possible to use any one of molybdenum disulfide, disulfide tungsten, graphite, and boron nitride. Molybdenum, disulfide and graphite have a lamellar crystal structure referred to as a hexagonal crystal, and boron nitride has a flaky, crystal structure. It is also possible to use a combination of two or more lubricating powders selected from among the above materials.

Next, a strain wave gearing of the present invention has a rigid internally toothed gear, a flexible externally toothed gear arranged coaxially inside the internally toothed gear, and a wave generator mounted coaxially inside the externally toothed gear for flexing the externally toothed gear into a non-circular shape to mesh with the internally toothed gear and for moving meshing positions between the two gears in a circumferential direction, the strain wave gearing being characterized in that the above-mentioned lubricating powders are filled inside the externally toothed gear and the inner parts of the wave generator. On the other hand, an oil lubricant or a grease lubricant is applied on or filled in the teeth of the internally toothed gear and the externally toothed gear.

BRIEF DESCRIPTION OF THE DRAWINGS

FIGS. 2(A) through 2(D) are graphs showing comparison results of efficiency of a reduction gear in cases of powder lubrication and grease lubrication;

MODE FOR CARRYING OUT THE INVENTION

A method for lubricating a strain wave gearing of the present invention will be described with reference to the drawings.

Figure 1B:
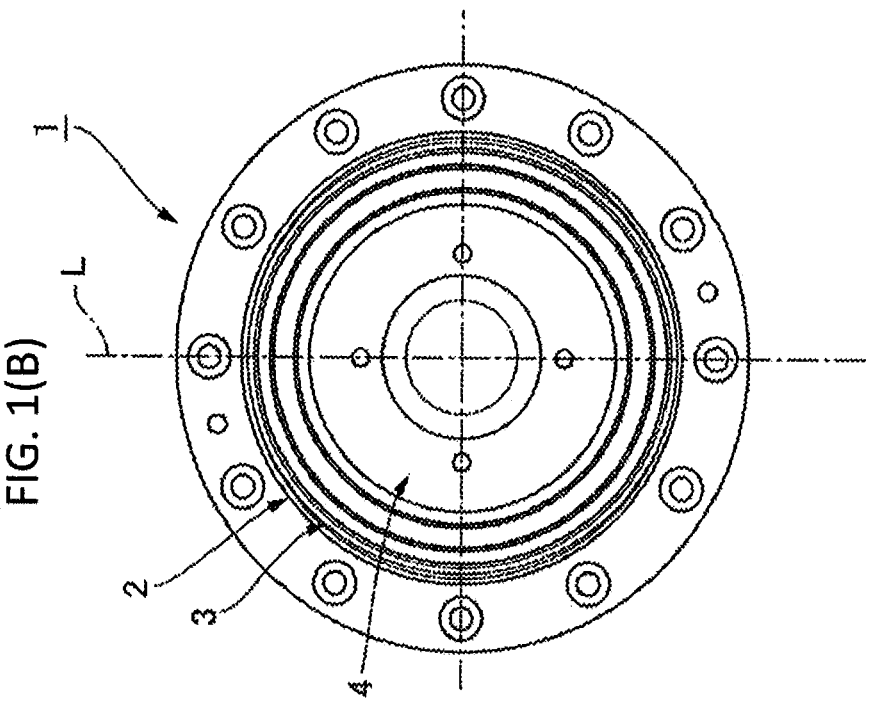
FIGS. 1(A) and 1(B) include a schematic longitudinal sectional view and a schematic front view showing an example of a strain wave gearing.
Figure 1A:
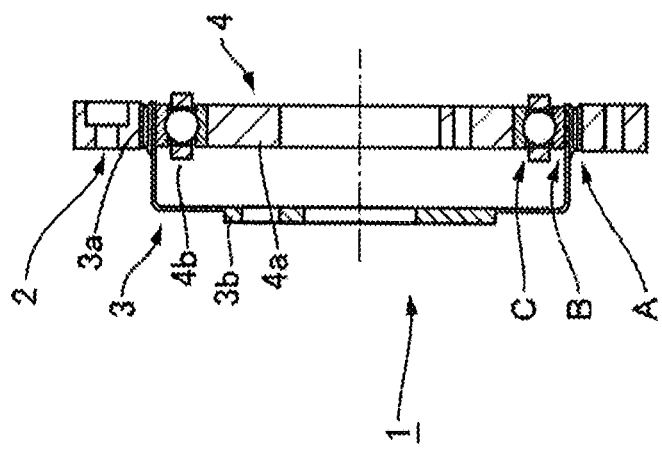

FIGS. 1(A) and 1(B) are a schematic longitudinal sectional view and a schematic front view showing an example of a strain wave gearing to which the present invention is applicable. The strain wave gearing 1 is called as a cup type, and is provided with an annular rigid internally toothed gear 2, a cup-shaped flexible externally toothed gear 3, and an elliptically contoured wave generator 4. The externally toothed gear 3 is arranged coaxially inside the internally toothed gear 2. The wave generator 4 is mounted inside a cylindrical external-tooth forming portion 3a of the externally toothed gear 3. External teeth, which are formed on the outer circumference of the external-tooth forming portion 3a flexed elliptically by the wave generator 4, mesh with internal teeth of the internally toothed gear 2 at positions on both ends of the major axis L of the elliptical shape.

When the strain wave gearing 1 is used as a reduction gear, the wave generator 4 is rotated at high speeds by a motor or the like. For example, the internally toothed gear 2 is fixed to a not-shown casing or another member, and the externally toothed gear 3 is rotated at a reduced speed. The reduced-speed rotation is derived out to a not-shown output shaft which is connected coaxially to a rigid boss 3b formed in the externally toothed gear 3.

Main portions to be lubricated in the strain wave gearing 1 include a contact part (teeth) A, a contact part B between the inner peripheral surface of the external-tooth forming portion 3a of the externally toothed gear 3 and the outer peripheral surface of the wave generator 4, and a contact part inside of the wave generator 4. The contact part C inside of the wave generator 4 includes a contact portion between a wave plug 4a and a wave bearing 4b, contact portions among component parts of the wave gearing 4b, and other portions. A commonly-used oil lubrication or grease lubrication is applied for the contact part (teeth) A among the parts.

On the other hand, a fine-powder lubrication is applied for the contact part B and the contact part C. Specifically, a lubrication is carried out by using soft inorganic lubricating fine powders having a lamellar crystal structure. According to experiments conducted by the present inventor et al, it was confirmed that it is desirable, as the lubricating fine powders, to use fine particles having an average particle diameter of 15 µm or less in order to obtain a desired lubricating effect so as to realize a smooth rotation of the wave generator 4. It was also confirmed that it is desirable for the fine powders to be soft and have a Mohs hardness of 1.5 or less.

As the lubricating fine powders having a lamellar crystal structure, it is possible to use any one of molybdenum disulfide, disulfide tungsten, graphite, and boron nitride. It is also possible to use a combination of two or more lubricating powders selected from among the above materials.

FIG. 2 includes graphs showing an example of comparison results of efficiency of a reduction gear between a case in which a grease is used to lubricate the contact parts and a case in which lubricating fine powders are used to lubricate the contact parts except for the teeth. FIGS. 2(A) and 2(B) show relationships between an output torque and an efficiency at each rotational speed in a case in which a grease is used to lubricate the strain wave gearing 1 shown in FIG. 1 (Type A) and in a case in which lubricating fine powders are used to lubricate the same, respectively. FIGS. 2(C) and 2(D) show the similar relationships in a case in which a grease is used to lubricate a cup-type strain wave gearing (Type B) different from the strain wave gearing 1, and in a case in which lubricating fine powders are used to lubricate the same, respectively.

It is evident form these graphs that, in comparison with the grease lubrication, the efficiency is improved and no substantial difference in efficiency due to input rotational speeds is observed in the low-load region in the case of the fine-powder lubrication. Further, it is shown that the efficiency is approximately 90% (the value being close to the meshing efficiency of gears in a strain wave gearing) throughout an almost entire operational region. Therefore, the change in efficiency due to operational conditions is decreased by using the fine-powder lubrication, thereby improving a controllability of the strain wave gearing.

Next, the present inventor et al. observed the state of lubricating fine powders after the operation of the strain wave gearing is started, and confirmed the following behavior thereof.

Figure 3B:
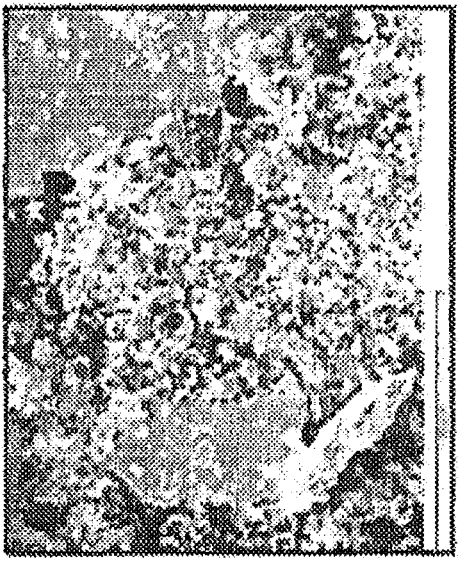
FIGS. 3(A) and 3(B) are photomicrographs showing lubricating fine powders that become a fine-particle state after the operation is started.
Figure 3A:

Specifically, the filled lubricating fine powders are crushed between the contact surfaces of each contact part, and are moved and adhered on the both contact surfaces to form thin surface films during the operation of the strain wave gearing. In addition, the powders are thinly spread by pressure, and are changed into finer particles that facilitate intrusion into the space between the contact surfaces. FIG. 3(A) is a photomicrograph (×100) showing fine particles formed in each contact part after the operation of the strain wave gearing is started, and FIG. 3(B) is an enlarged photomicrograph (×1000) showing a part of portions shown in FIG. 3(B).

With the fine particles having changed in shape and the thin surface films formed on the both contact surfaces, lubrication is maintained in the contact parts, and decrease in frictional resistance in each frictional part is also obtained. In addition, neither the thin surface films moved and adhered on the contact surfaces nor fine particles subdivided via spreading by pressure is viscous, and no viscous resistance loss is exhibited.

Further, according to the method for lubricating by using the lubricating fine powders having a lamellar crystal structure, the following effects were confirmed.

(a) It is possible to lubricate in a wide range of operating temperature from a low temperature (−75° C.) to a high temperature (250° C. at which fine powders of molybdenum disulfide having a low oxidation temperature are not oxidized.)

(b) There is less heat generation in a lubrication using lubricating fine powders compared to a lubrication using an oil or grease. For example, according to experiments conducted by the present inventor et al., it was confirmed that, compared to the inner temperature of the strain wave gearing in a case of a grease lubrication, the inner temperature is low by about 15° C. to 18° C. in a case of a lubricating-fine-powder lubrication.

(c) There is occurred a lubricant leakage from contact surfaces during static load being applied in a case of an oil or grease lubrication, whereas no lubricant leakage occurs during static load being applied in a case of a lubricating-fine-powder lubrication. Therefore, the contact parts can surely be lubricated even in a condition in which a stopping period is long and an operation is carried out at a low frequency.

(d) The lubrication by lubricating fine powders can also be applicable in a case in which a low-speed rotation is inputted.

In order to realize a sufficient lubricating effect and a smoother rotation of the wave generator from the initial operational stage of the strain wave gearing, it was confirmed that it is effective to perform a break-in operation at a low-load condition (aging).

In addition, it was confirmed that a break-in operation can be skipped if lubricating fine powders are moved and adhered to the contact surfaces by sliding and rolling movements under a low surface pressure with respect to the contact surfaces of each contact part before the strain wave gearing is assembled. It was also confirmed that a shot peening of lubricating fine powders onto each contact surface is effective for moving and adhering thin films on each contact surface.

Figure 4C:
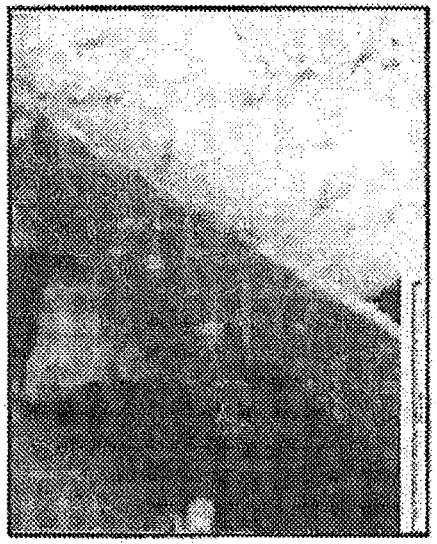
FIGS. 4(A) through 4(C) are photomicrographs showing lubricating fine powders being made into a thin flaky shape by means of spreading by pressure.
Figure 4B:
Figure 4A:

Further, it is possible for lubricating fine powders filled inside the externally toothed gear and into the inner part of the wave generator to spread by pressure beforehand to form fine powders having a thin-flaky shape. FIGS. 4(A) and 4(B) are photomicrographs (×100) showing fine particles of thin flaky shape by means of spreading by pressure, and FIG. 4(C) is a photomicrograph (×1000) showing a part thereof. It was confirmed that the filling of thus flaky-shaped fine powders is effective to obtain a smooth rotation of the wave generator, in particular during art initial operation of the wave generator.

As mentioned above, in a strain wave gearing, contact parts of which is lubricated by lubricating fine powders of the present invention, the wave generator shows no viscous resistance to loss, thereby realizing a high efficiency in a low-load region and a high-speed rotation region.

The invention claimed is:

1. A method for lubricating a strain wave gearing, wherein an inorganic lubricating powder having a lamellar crystal structure is used to lubricate each of contact parts of the strain wave gearing other than teeth of an externally toothed gear and an internally toothed gear, wherein an average particle diameter of the lubricating powder is equal to or less than 15 μm, wherein a Mohs hardness of the lubricating powder is equal to or less than 1.5, and wherein a flaky powder is formed by spreading the lubricating powder by pressure to crush into a flaky shape, and the flaky powder is filled, in a powder state, inside externally toothed gear and into an inner part of a wave generator of the strain wave gearing and is used for lubrication.

2. The method for lubricating the strain wave gearing according to claim 1, wherein the lubricating powder is at least one of molybdenum disulfide, disulfide tungsten and graphite.

3. A strain wave gearing comprising:
a rigid internally toothed gear;
a flexible externally toothed gear arranged coaxially inside the internally toothed gear; and
a wave generator mounted coaxially inside the externally toothed gear for flexing the externally toothed gear into a non-circular shape to mesh with the internally toothed gear and for moving meshing positions between the two gears in a circumferential direction, wherein a lubricating powder as a lubricant is filled, in a powder state, inside the externally toothed gear and an inner portion of the wave generator, the lubricating powder having a lamellar crystal structure, and having a prescribed particle diameter and a prescribed hardness, wherein an average particle diameter of the lubricating powder is equal to or less than 15 μm, wherein a Mohs hardness of the lubricating powder is equal to or less than 1.5, wherein the lubricating powder is a flaky powder in state being crush into a flaky shape by means of spreading by pressure.

4. The strain wave gearing according to claim 3, wherein contact surfaces between the externally toothed gear and the wave generator, and contact surfaces in the wave generator are covered by a surface film that is formed by moving and adhering the lubricating powder onto each of the contact surfaces.

5. The strain wave gearing according to claim 3, wherein the lubricating powder is at least one of molybdenum disulfide, disulfide tungsten, and graphite.

* * * * *